(12) United States Patent
Hurtta

(10) Patent No.: US 7,333,473 B1
(45) Date of Patent: Feb. 19, 2008

(54) METHOD AND SYSTEM FOR MODIFYING THE CONTENTS OF A DATABASE OF A COMMUNICATION NETWORK, AND COMMUNICATION NETWORK

(75) Inventor: Tuija Hurtta, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/275,118

(22) PCT Filed: May 8, 2000

(86) PCT No.: PCT/EP00/04118

§ 371 (c)(1),
(2), (4) Date: Apr. 29, 2003

(87) PCT Pub. No.: WO01/86991

PCT Pub. Date: Nov. 15, 2001

(51) Int. Cl.
*H04L 12/66* (2006.01)

(52) U.S. Cl. .................. 370/352; 455/445

(58) Field of Classification Search .......... 370/379, 370/465, 331, 311, 354, 352; 455/433
See application file for complete search history.

(56) References Cited

U.S. PATENT DOCUMENTS

| 6,091,952 | A | | 7/2000 | Xu et al. .................. 455/433 |
|---|---|---|---|---|
| 6,104,929 | A | * | 8/2000 | Josse et al. .............. 455/445 |
| 6,137,783 | A | * | 10/2000 | Sallberg .................... 370/316 |
| 6,230,005 | B1 | * | 5/2001 | Le et al. ................... 455/414.1 |
| 6,377,804 | B1 | * | 4/2002 | Lintulampi ............... 455/435.2 |
| 6,415,151 | B1 | * | 7/2002 | Kreppel .................... 455/445 |
| 6,466,556 | B1 | * | 10/2002 | Boudreaux ............... 370/331 |
| 6,480,476 | B1 | * | 11/2002 | Willars ..................... 370/311 |
| 6,584,098 | B1 | * | 6/2003 | Dutnall ..................... 370/354 |

FOREIGN PATENT DOCUMENTS

| GB | 2307828 A | 6/1997 |
|---|---|---|
| WO | 98/59505 | 12/1998 |

OTHER PUBLICATIONS

IEEE 47th Vehicular Technology Conference, Phoenix, May 1997 "Analysis of Multi-Slot MAC Protocols proposed for the GSM Phase 2+General Packet Radio Service" G. Brasche vol. 2, No. conf. 47, pp. 1295-1300.

* cited by examiner

*Primary Examiner*—Edan Orgad
*Assistant Examiner*—Lawrence J Burrowes
(74) *Attorney, Agent, or Firm*—Squire, Sanders & Dempsey, L.L.P.

(57) ABSTRACT

A communication network, system and method are provided in which at least one database is provided in or for a first network element and contains connection information sets for the user equipment, the connection information sets including an address of a second network element, and the connection information sets corresponding to active or activated connections. The first network element provides connections, to and/or from user equipment, and/or transmits data to and/or from the user equipment, using one or more of the addresses of the second network element included in the connection information sets. The communication network, system, and method are also configured to send, when the connection is to be continued using another network element or using different connection information, a message containing change information to the first network element which is configured to change, in response to this message, the address contained in at least two connection information sets.

26 Claims, 4 Drawing Sheets

US 7,333,473 B1

METHOD AND SYSTEM FOR MODIFYING THE CONTENTS OF A DATABASE OF A COMMUNICATION NETWORK, AND COMMUNICATION NETWORK

FIELD OF THE INVENTION

The present invention relates to a method and system for modifying the contents of a database of a communication network, and to a communication network comprising a database which may be updated in a simplified manner.

BACKGROUND OF THE INVENTION

When handling a connection in a communication network, there is sometimes the need of actualising the connection parameters in order to compensate, or take account of, changed conditions. For instance, in a mobile communication, a connection between two entities (e.g. a call originating entity and a call terminating entity) may be performed using one or more intermediate network elements. When the entity, or any network element involved in providing the connection, is moving, the connection may be handed over to another network element such as another support node, switching centre, base station, or the like. The connection parameters may also be changed in consideration of other parameters such as changing quality of service (QoS) caused e.g. by noise sources of changing strength. The connection, e.g. a PDP context, may be used to carry data traffic. A call is just one example of possible applications. Other examples of connections are web surfing (http), remote connections (telnet), file transfers (ftp), etc.

When the connection is handed over to another network element, one or more of the network elements involved in handling the connection must be informed on this change. For example, a new network element may send its address to a co-operating network element for informing this element on the necessity of addressing any subsequent traffic to the new network element.

In a packet-switched network such as a GPRS (General Packet Radio Service) or UMTS (Universal Mobile Telecommunications System) network, there may be provided parameter tables defining the handling of the packet transmission. These parameter tables may contain data fields defining the supported PDP (Packet Data Protocol) type such as X.25, PPP, or IP, a PDP address to which the connection is to be directed, and further data such as QoS profile subscribed, access point name (APN) describing the access point to an external packet data network, and the like.

Such parameter tables may e.g. be represented by PDP contexts. When handling a packet-switched communication, multiple PDP contexts may be activated, e.g. to support multimedia. In such a case, several PDP contexts will have to be updated when handing over the connections from one network element such as an old serving support node (e.g. a SGSN, i.e. a Serving GPRS Support Node) to another network element, for instance, a new serving support node (e.g. a new SGSN). In such a case, the updating of the PDP contexts is performed one by one by sending messages to a network element containing the parameter tables including addresses of the network elements. Such a network element may be, in a GPRS or UMTS network, for instance a GGSN (Gateway GPRS Support Node). The network element acknowledges the update requests by sending response messages. The number of required messages to be sent on the interfaces between these network elements is therefore equal to twice the number of PDP contexts in case of multiple PDP contexts.

A similar situation will occur when parameter tables of other nature are updated one by one for adapting the system to changed conditions.

SUMMARY OF THE INVENTION

An object of the present invention is to provide a method for modifying the contents of a database of a communication network which method requires only a small number of messages.

The invention provides a method and system which may perform update procedures requiring only a small number of messages to be transmitted and/or returned. This reduced number of messages not only reduces the necessary processing load for processing messages but also reduces the signalling load of the network.

According to the invention, the updating of two or more connection information sets can be performed using only one or a few messages to a network element containing, or co-operating with, a connection handling database, the total number of necessary messages being smaller than twice the number of connection information sets to be updated. In a preferred case, only a single updating message is sent to a network element, and, if at all, only one response message confirming the updating is returned.

The database preferably stores information on logical tunnels or connections.

The claimed structure therefore drastically reduces the overhead on the interfaces transmitting the messages, such as the Gn and Gp interfaces in a packet-switched network such as GPRS or UMTS. Likewise, the processing load of the message sending and receiving is decreased.

The connection information sets may comprise information sets of any kind which include one or more addresses of a network element necessary for directing the traffic on the connections.

In a preferred embodiment the connection information sets are PDP contexts wherein at least two PDP contexts are active or at least provided for handling data transmission. Such a provision or activation of multiple PDP contexts is useful under several conditions such as supporting multimedia transmission. Such PDP contexts may be called primary and secondary PDP contexts. The first PDP context with a PDP address is called a primary PDP context. The next one(s) with the same PDP address is/are called secondary PDP context(s).

In a preferred embodiment, these PDP contexts are updated with only one message from a serving support node to a gateway support node such as from an SGSN to a GGSN. The gateway support node acknowledges with only one message to the serving support node.

When for instance changing the serving support node (such as the SGSN) because of a movement of one or more components involved in handling a connection, and/or because of other reason, only the address or addresses of that component (e.g. the serving support node address for signalling and/or the serving support node address for user traffic) will change. It will then be enough to send only the new serving support node address(es) to the gateway support node (such as the GGSN). In case further information should likewise change such as TEIDs (Tunnel Endpoint Identifier Data and/or Tunnel Endpoint Identifier Signalling) or TIDs (Tunnel Identifiers), this changed information can likewise be included in the one message sent to the gateway support node. This information may also be included in the one response message returned from the gateway support node to the new serving support node.

The invention therefore generally provides a method and system for modifying the contents of a database of a communication network, said database being provided in or for at least one first network element and containing connection information sets for at least one user equipment, the connection information sets including one or more addresses of a second network element, the first network element being adapted to provide connections to and/or from the user equipment, and/or transmit data to and/or from the user equipment, using one or more of the addresses of the second network element included in the connection information sets, wherein, when a connection is to be continued using another, third network element, or using different connection information, a message containing change information is sent to the first network element which, when not refusing this request or update, in response thereto changes the address or addresses contained in the connection information sets. The connection information sets preferably comprise or are s active PDP contexts. The first network element may be a Gateway GPRS Support Node (GGSN). The second and/or third network elements preferably is/are serving support nodes of the communication network.

The second and/or third network elements may also be RNCs (Radio Network Controllers). A connection may then be changed from one RNC to another RNC.

The message containing change information may be an "Update PDP Context" message.

In a preferred embodiment, the change information indicates addresses of a further serving support node of the communication network selected for handling the subsequent connection between the first network element and the user equipment. The change information may additionally or alternatively indicate Tunnel Endpoint Identifiers (TEIDs).

The change information will preferably be sent from a serving support node to the first network element when this serving support node is selected for taking over the handling of the connection.

The communication network is preferably implemented as a GPRS or UMTS network. The serving support node may then be a Serving GPRS Support Node (SGSN).

The user equipment may preferably be a mobile station.

The connection information sets may contain further data such as APNs (Access Point Name), TEIDs (two kinds), SGSN addresses (for signalling and user traffic), negotiated QoSs (QoS means Quality of Service), NSAPI etc.

DETAILED DESCRIPTION OF PREFERRED EMBODIMENTS OF THE INVENTION

Figure 1:
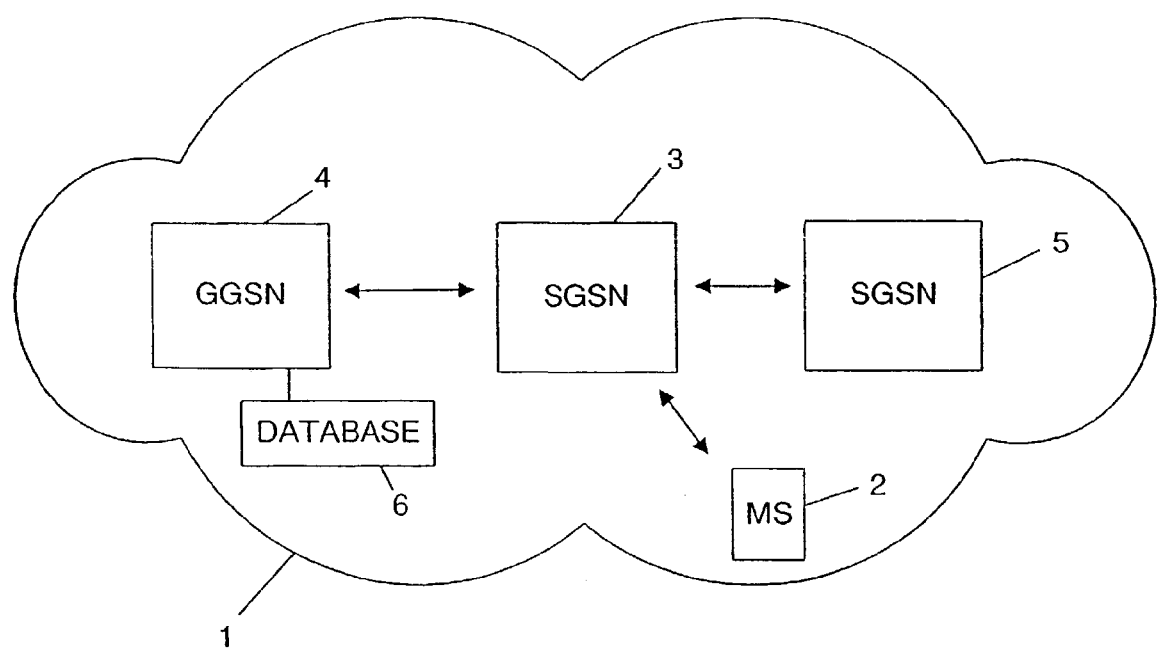
FIG. 1 shows a schematic structure of a basic configuration of one embodiment of the invention.

FIG. 1 shows a basic structure of a network 1 representing or incorporating an embodiment of the invention. In the present example, the network 1 is implemented as a GPRS or UMTS system but may also be a packet-switched or circuit-switched network of any other types such as a GSM (Global System for Mobile Telecommunications) or data network, or the like.

The network 1 shown in FIG. 1 comprises or communicates with a plurality of mobile stations MS 2 (only one MS is shown). The network 1 furthermore comprises a plurality of network elements 3 to 5 which are support nodes (SN) for handling connections to and/or from the mobile stations MS 2 to other terminal equipments such as mobile stations, communication centres, databases and the like. In the shown example, the support nodes 3 to 5 are GPRS Support Nodes (GSNs) wherein the support node 3 serves as a Serving GPRS Support Node (SGSN) which handles the connection between the MS 2 and the support node 4 which here provides the function of a Gateway GPRS Support Node (GGSN). The basic structure of a network of such a type is known and will therefore not be described here in detail. The GGSN 4 contains, or cooperates with a database 6 storing a plurality of connection information sets such as active PDP contexts for the MS(s) 2.

The GGSN 4 may handle a connection to another network (not shown) in which another terminal equipment such as a call originating or terminating equipment may be located.

The support node 5 may provide the function of an SGSN when e.g. the mobile station 2 is present in the geographical area covered by this support node. In the present example, the support node 5 is assumed to have previously handled the connection to and from the mobile station 2, and the connection handling has been transferred from SGSN 5 to SGSN 3 because of movement of the mobile station 2 (or because of any other reason) into an area which is covered by SGSN 3.

All network elements 2 to 5 shown in FIG. 1 are able to communicate with each other as necessary, as indicated by the double-headed arrows shown between the individual components.

Figure 2:
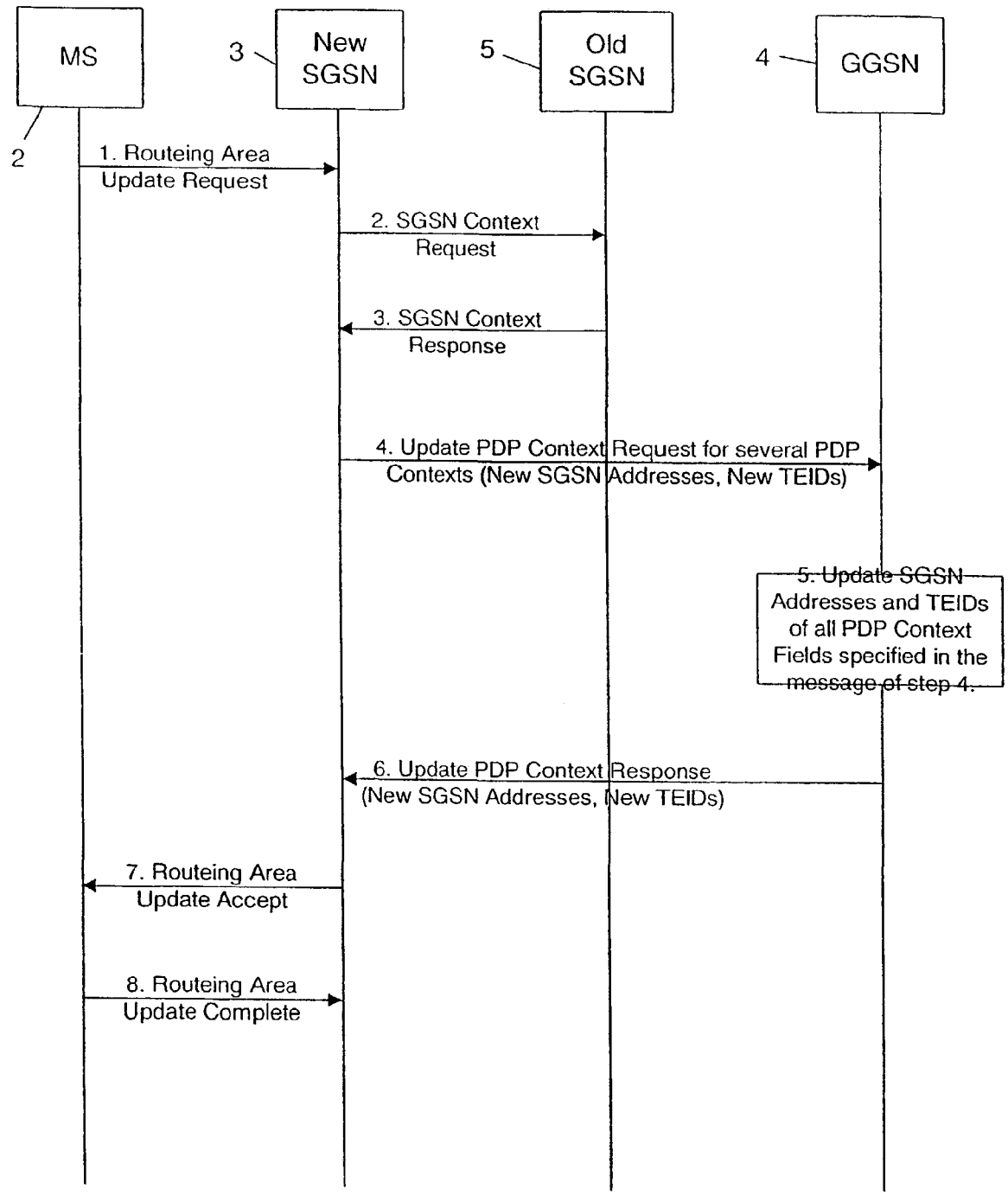
FIG. 2 illustrates the message flow and method steps performed in an embodiment of the invention.

FIG. 2 shows an embodiment of the message flow between the components 2 to 5 of the network 1 shown in FIG. 1, i.e. some of the method steps performed in accordance with the present invention. FIG. 2 shows an embodiment wherein a routing area update is performed because of movement of the mobile station 2 to another location which is better covered by the SGSN 3 (the new SGSN) than by SGSN 5 which previously handled the connection (the old SGSN).

In step 1.), the MS 2 sends a "Routeing Area Update Request" to the new SGSN 3. This request may contain information defining the old routeing area identity (RAI), the old packet temporary mobile subscriber identity (P-TMSI) and the update type. This request is known and described e.g. in the 3GPP TS 23.060.

The new SGSN 3 sends, as step 2.), an "SGSN Context Request" to the old SGSN 5 to get the MM (Mobility Management) and PDP (Packet Data Protocol) contexts for the MS 2. The old SGSN 5 may validate the old P-TMSI, and responds, in a step 3.), with an "SGSN Context Response".

In step 4.), the new SGSN 3 sends an "Update PDP Context Request" to the GGSN(s) 4 concerned. This "Update PDP Context Request" is a request for updating several PDP contexts, and specifies, as shown in the brackets of step 4.), the new SGSN address(es) and the new TEID(s) (Tunnel Endpoint Identifier(s). Instead of one or more TEIDs, the "Update PDP Context Request" may also specify one or more TIDs (Tunnel Identifiers).

In step 5.), the GGSN 4 updates, in its database 6, the one or more new SGSN addresses and one or more new TEIDs received in step 4.), in all of the PDP context fields (primary and secondary PDP context fields) indicated by the message of step 4.) and activated for the MS 2, by replacing the previous SGSN address(es) and previous TEID(s) by the new SGSN address(es) and new TEID(s), but maintains all other information contained in the multiple PDP contexts activated for that MS 2, such as the PDP type, PDP address, access point name (APN) and protocol configuration options parameters.

For updating all PDP contexts activated for a mobile station 2, it is therefore sufficient to send only one request such as "Update PDP Context Request" from the network element 3 to the network element 4.

After updating of all the PDP context fields for the MS 2 in step 5.), the GGSN 4 returns, in step 6.), an "Update PDP Context Response" message to the new SGSN 3.

The new SGSN 3 may perform other steps not shown in FIG. 2, such as sending a message to the Home Location Register (HLR) informing it of the change of the SGSN.

The new SGSN 3 validates the presence of the mobile station 2 in the new routing area. If all checks are successful, the new SGSN 3 constructs MM and PDP contexts for the mobile station 2, and a logical link is established between the new SGSN 3 and the MS 2. The new SGSN 3 responds to the MS 2 with a "Routeing Area Update Accept" message indicating the new P-TMSI, and the like. This message is sent in step 7.) of FIG. 2. In step 8.), the MS 2 acknowledges the new P-TMSI with a "Routeing Area Update Complete" message.

Generally, the TEID in the header of an Update PDP Context Request message indicates which PDP context the signalling affects. Here, it is proposed to set the TEID according to the TEID of the primary PDP context.

For every PDP context, two SGSN addresses are needed (in the Update PDP Context Request message): SGSN Address for Signalling and SGSN Address for User traffic. If the addresses are the same for all the PDP contexts in question, it is enough to send the addresses only once.

The same applies to GGSN addresses. For every PDP context, two GGSN addresses are needed: GGSN Address for Signalling and GGSN Address for User traffic (in the Update PDP Context Response message).

In the Update PDP Context Request message, NSAPI for every PDP context is needed to identify the PDP context in question. The PDP contexts may use the same TEID Signalling but TEID Data is different for every PDP context.

When the SGSN is changing, it is important to send the new information (SGSN address(es) for Signalling, SGSN Address(es) for User traffic, TEID Signalling, TEID Data per NSAPI) from the SGSN to the GGSN. The GGSN needs to send the new information (GGSN address(es) for Signalling, GGSN Address(es) for User traffic, TEID Signalling, TEID Data per NSAPI) only if the information changes.

Figure 3:
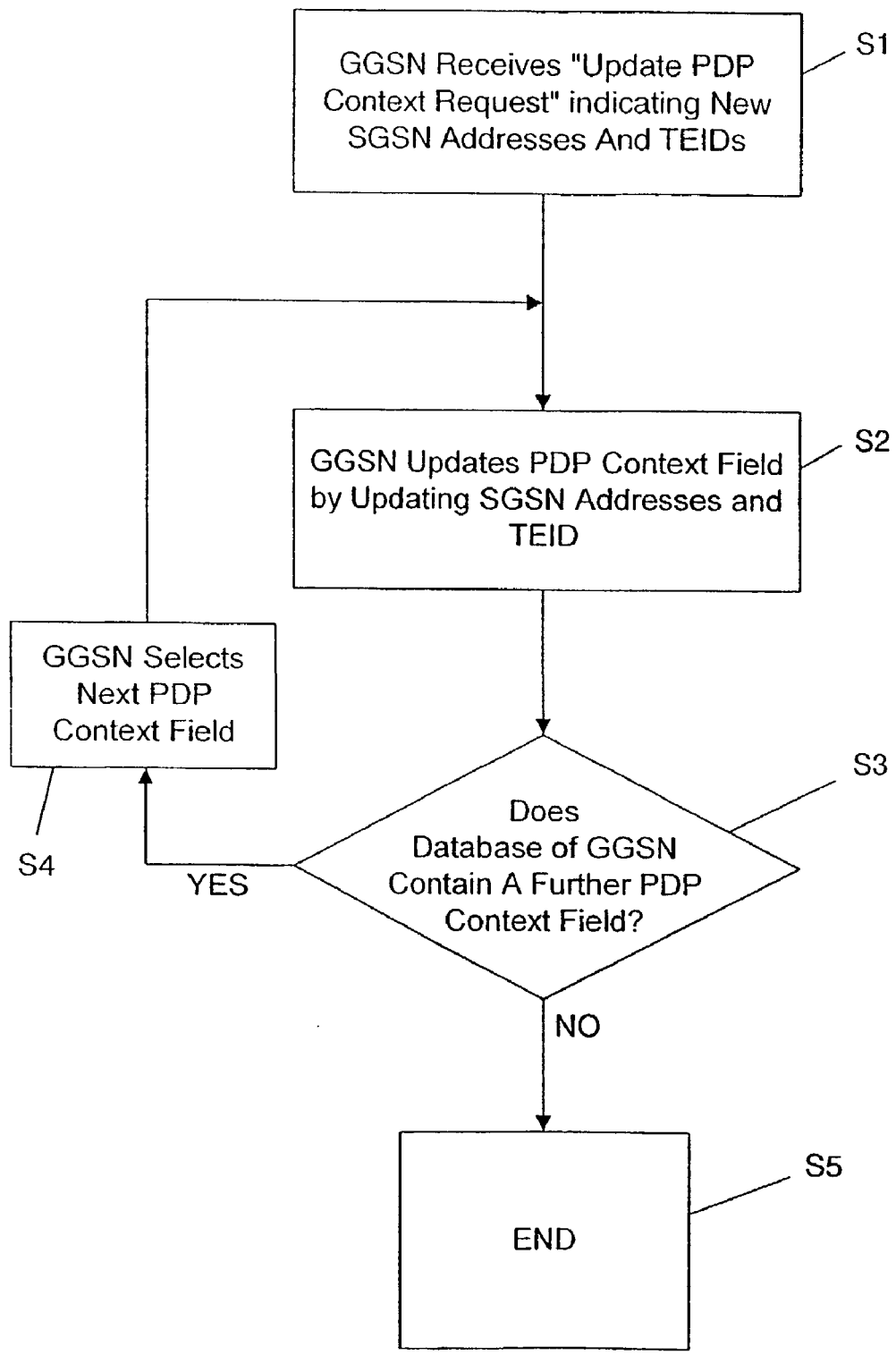
FIG. 3 shows an embodiment of an updating method performed in a gateway support node.

FIG. 3 shows an updating method carried out by the GGSN 4. In step S1, the GGSN 4 receives an "Update PDP Context Request" which defines one or more new SGSN addresses and one or more new TEIDs (or TIDs). This "Update PDP Context Request" is sent from the new SGSN 3 in step 4.) of FIG. 2. The GGSN 4 is adapted to perform the steps S2 to S4 shown in FIG. 3 as response to the receipt of the "Update PDP Context Request" message. In step S2, the GGSN 4 selects, from the database 6, a first PDP context field activated for the MS 2 (the identity thereof is indicated in the update PDP context request of step S1 so as to inform the GGSN 4 on the identity of the MS 2). For performing the updating of step S2, the GGSN replaces the previously stored SGSN address or addresses (for signalling and/or for user traffic) with the SGSN address(es) indicated in the message sent in step 4.) of FIG. 2, and by replacing the previously stored TEIDs (Tunnel Endpoint Identifier Data and/or Tunnel Endpoint Identifier Signalling) by the new TEIDs indicated in the message of step 4.) of FIG. 2.

After updating the first PDP context field activated for the MS 2, the GGSN 4 proceeds to step S3 wherein the GGSN checks whether its PDP context fields database 6 contains a further PDP context field for that MS 2. If the answer is yes, the GGSN performs step S4 and selects the next PDP context field for that MS 2. The process then goes back to step S2, wherein the selected next PDP context field for that MS 2 is updated by updating the SGSN address(es) and TEID(s).

Thereafter, step S3 is again carried out and, if present, a next PDP context field for that MS 2 is selected in step S4, and step S2 is performed again. When all PDP context fields for the MS 2 in question have been updated, the answer of step S3 is "NO" whereupon the updating process ends (step S5).

Figure 4:
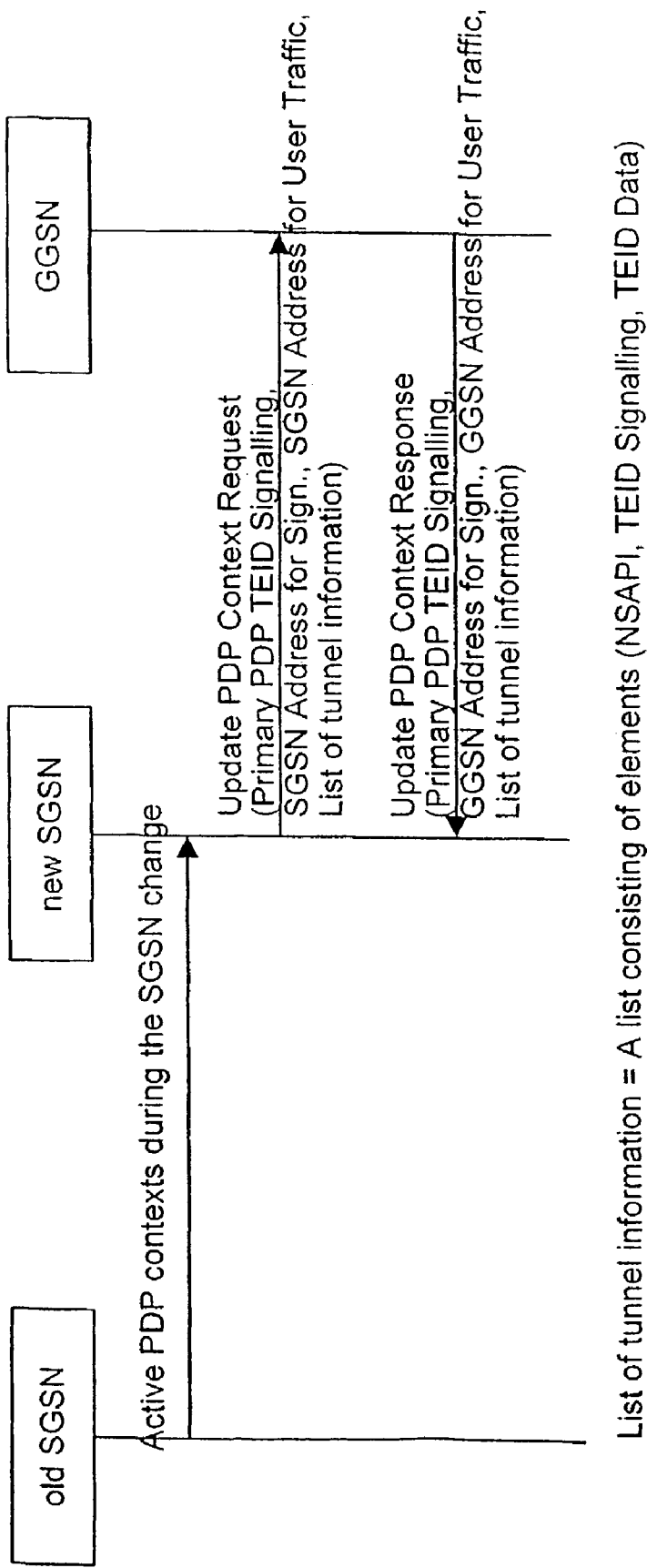
FIG. 4 illustrates some details of the contents of the messages transmitted in an embodiment of the invention.

FIG. 4 illustrates the contents of the messages transmitted when performing a change of the SGSNS, in more detail. The shown steps essentially correspond to steps 3.), 4.), and 6.) of FIG. 2.

In the above embodiments, the invention has been described by referring to multiple PDP contexts activated for the MS 2 which represent a plurality of connection information sets. The invention is also applicable with regard to other types of connection information sets wherein two or more connection information sets are stored for handling a communication to and from an entity such as a user equipment. Furthermore, the invention is not only applicable to packet-switched networks such as GPRS or UMTS, but can also be incorporated in other types of networks.

The invention claimed is:

1. A method for modifying the contents of a database of a communication network, the method comprising:

configuring said database to be in or for at least one first network element and containing connection information sets for at least one user equipment;

configuring the connection information sets to include one or more addresses of a second network element, and the connection information sets to correspond to active or activated connections;

configuring the first network element to provide connections to and/or from the user equipment, and/or transmit data to and/or from the user equipment, using one or more of the addresses of the second network element included in the connection information sets;

when the connection is to be continued using another network element, third network element, or using different connection information, sending a message containing change information to the first network element; and configuring the first network element to change, in response to this message, the address or addresses contained in at least two connection information sets, wherein the connection information sets are active packet data protocol contexts.

2. The method according to claim 1, wherein the connection information sets contain information which defines parameters for the connection.

3. The method according to claim 1, wherein the first network element is a gateway general packet radio service support node.

4. The method according to claim 1, wherein the second and/or third network elements is/are serving support nodes of the communication network.

5. The method according to claim 1, wherein the second and/or third network elements is/are radio network controllers of the communication network.

6. The method according to claim 1, wherein
the change information indicates addresses of a further serving support node of the communication network selected for handling the subsequent connection between the first network element and the user equipment.

7. The method according to claim 1, wherein
the change information indicates tunnel endpoint identifiers or tunnel identifiers.

8. The method according to claim 1, wherein
the change information is sent from a serving support node to the first network element when this serving support node is selected for taking over the handling of the connection.

9. The method according to claim 8, wherein the serving support node is a serving gateway general packet radio service support node.

10. The method according to claim 1, wherein the communication network is a general packet radio service or a universal mobile telecommunications system network.

11. The method according to claim 1, further comprising:
providing at least two packet data protocol contexts as active packet data protocol contexts which are updated with only one message from a serving support node to a gateway support node.

12. A system for modifying the contents of a database of a communication network, the system comprising:
a first network element;
a second network element; and
a user equipment, wherein said database is provided in or for the first network element and contains connection information sets for the user equipment, the connection information sets including one or more addresses of the second network element, and the connection information sets corresponding to active or activated connections, wherein the first network element is configured to provide connections to and/or from the user equipment, and/or transmit data to and/or from the user equipment, using one or more of the addresses of the second network element included in the connection information sets, wherein, when the connection is to be continued using another network element, third network element, or using different connection information, the system is configured to send a message containing change information to the first network element which is configured to change, in response to this message, the address or addresses contained in at least two connection information sets, and wherein the connection information sets are active packet data protocol contexts.

13. The system according to claim 12, wherein the connection information sets contain information defining parameters for the connection.

14. The system according to claim 12, wherein the first network element is a gateway general packet radio service support node.

15. The system according to claim 12, wherein the second and/or third network elements is/are serving support nodes of the communication network.

16. The system according to claim 12, wherein the change information indicates addresses of a further serving support node of the communication network selected for handling the subsequent connection between the first network element and the user equipment.

17. The system according to claim 12, wherein the change information indicates tunnel endpoint identifiers or tunnel identifiers.

18. The system according to claim 12, wherein, when a serving support node is selected for taking over the handling of the connection, this serving support node is configured to send the change information to the first network element.

19. The system according to claim 18, wherein the serving support node is a serving general packet radio service support node.

20. The system according to claim 12, wherein the communication network is a general packet radio service or a universal mobile telecommunications system network.

21. The system according to claim 12, wherein at least two packet data protocol contexts are active packet data protocol contexts which are updated with only one message from a serving support node to a gateway support node.

22. A communication network having several network elements, comprising:
a first network element;
a second network element; and
a user equipment, wherein at least one database is provided in or for the first network element and contains connection information sets for the user equipment, the connection information sets including one or more addresses of the second network element, and the connection information sets corresponding to active or activated connections, wherein the first network element is configured to provide connections, to and/or from the user equipment, and/or transmit data to and/or from the user equipment, using one or more of the addresses of the second network element included in the connection information sets, wherein the communication network is configured to send, when the connection is to be continued using another network element, third network element, or using different connection information, a message containing change information to the first network element which is configured to change, in response to this message, the address or addresses contained in at least two connection information sets, and wherein the connection information sets are active packet data protocol contexts.

23. The network according to claim 22, wherein the communication network is a general packet radio service or a universal mobile telecommunications system network.

24. The network according to claim 22, wherein at least two packet data protocol contexts are active packet data protocol contexts which are updated with only one message from a serving support node to a gateway support node.

25. A serving general packet radio service support node configured to modify contents of a database provided in or for the serving support node, said database comprising connection information sets for a user equipment, the connection information sets comprising one or more addresses of a network element, and the connection information sets corresponding to active or activated connections, wherein the serving support node is configured to provide connections to and/or from the user equipment, and/or transmit data to and/or from the user equipment, using one or more of the addresses of the network element included in the connection information sets, wherein, when the connection is to be continued using another network element, or using different connection information, the serving support node is configured to receive a message comprising change information and the serving support node is configured to change, in response to this message, the address or addresses contained in at least two connection information sets, and wherein the connection information sets are active packet data protocol contexts.

26. A gateway general packet radio service support node configured to modify contents of a database provided in or for the gateway support node, said database comprising connection information sets for a user equipment, the connection information sets including one or more addresses of a network element, and the connection information sets corresponding to active or activated connections, wherein the gateway support node is configured to provide connections to and/or from the user equipment, and/or transmit data to and/or from the user equipment, using one or more of the addresses of the network element included in the connection information sets, wherein, when the connection is to be continued using another network element, or using different connection information, the gateway support node is configured to receive a message containing change information, the gateway support node is configured to change, in response to this message, the address or addresses contained in at least two connection information sets, and wherein the connection information sets are active packet data protocol contexts.

* * * * *